US005761976A

United States Patent [19]

Bailey

[11] Patent Number: 5,761,976

[45] Date of Patent: Jun. 9, 1998

[54] KNIFE ASSEMBLY

[75] Inventor: Lyle E. Bailey, Green Bay, Wis.

[73] Assignee: Automatic Handling, Inc., Erie, Mich.

[21] Appl. No.: 842,704

[22] Filed: Apr. 15, 1997

[51] Int. Cl.[6] ................................ B23B 5/14; B23B 21/00

[52] U.S. Cl. ................................ 82/70.1; 82/100; 83/955

[58] Field of Search ................................ 82/86, 70.2, 75, 82/83, 100, 101; 83/955

[56] References Cited

U.S. PATENT DOCUMENTS

| | | | |
|---|---|---|---|
| 1,504,703 | 8/1924 | Nicholas | 82/100 X |
| 2,114,272 | 4/1938 | Temple | 82/100 X |
| 4,072,072 | 2/1978 | Harb | 82/86 |
| 4,693,149 | 9/1987 | Sireix | 82/100 X |
| 4,693,157 | 9/1987 | Looser | 83/955 X |
| 5,383,380 | 1/1995 | Sartori | 82/101 X |
| 5,555,783 | 9/1996 | Pienta | 82/101 X |

*Primary Examiner*—A. L. Pitts
*Assistant Examiner*—Henry W.H. Tsai
*Attorney, Agent, or Firm*—Emch, Schaffer, Schaub & Porcello, Co., L.P.A.

[57] ABSTRACT

The present invention is directed to a knife assembly which is used to cut a rotating tube, such as a paper or plastic tube. The circular knife remains stationary during the cutting. After a number of cuts, the knife becomes dull. The present knife assembly rotates the circular blade or knife through a predetermined angle which results in an incremental movement of the circumference or cutting edge of the knife. A shaft has a first end which mounts the circular knife and a second end connected to a one-way clutch. An arm extends from the one-way clutch. Movement of the arm in a first direction rotates the shaft and moves the cutting surface of the knife. The arm is returned in an opposite direction. During this return arm movement the shaft and knife remain stationary. The assembly is then ready for the next cycle.

13 Claims, 4 Drawing Sheets

KNIFE ASSEMBLY

BACKGROUND OF THE INVENTION

The present invention is directed to a knife assembly and more specifically to an automatic indexing knife assembly for use with machines such as core cutting machines which are used to cut cores from cylindrical tubes of stock material. A prior art core cutting machine is shown in U.S. Pat. No. 5,555,783.

In prior art core cutting machines, a tube such as a cardboard or plastic tube is positioned on a mandrel. The mandrel is rotated and a knife assembly is moved against the cylindrical tube to cut a core of a predetermined width. The circular knife of the knife assembly remains stationary during the cutting operation.

In prior art knife assemblies, when the knife became dull after numerous cuts, the machine would be stopped and the knife assembly adjusted manually to place a new portion of the cutting edge circumference into position for contacting subsequent tubes during cutting.

The primary object of the present invention is to provide an improved knife assembly which indexes or rotates the knife blade to a new cutting surface.

SUMMARY OF THE INVENTION

The present invention is directed to an automatically indexing knife assembly which is used with a core cutting machine to cut a rotating tube, such as a paper or plastic tube.

The knife assembly of the invention indexes the circular blade or knife through a predetermined angle. The knife assembly includes a shaft which mounts a circular knife blade at one end and has a second end connected to a one-way clutch. An arm extends from and is operatively connected to the one-way clutch. Movement of the arm in a first direction rotates the shaft and moves the cutting surface of the knife. The arm is then returned in an opposite direction. During this return, the knife remains stationary. The knife assembly, according to the present invention, is then ready for the next cycle.

DETAILED DESCRIPTION OF THE PREFERRED EMBODIMENTS

Figure 1:
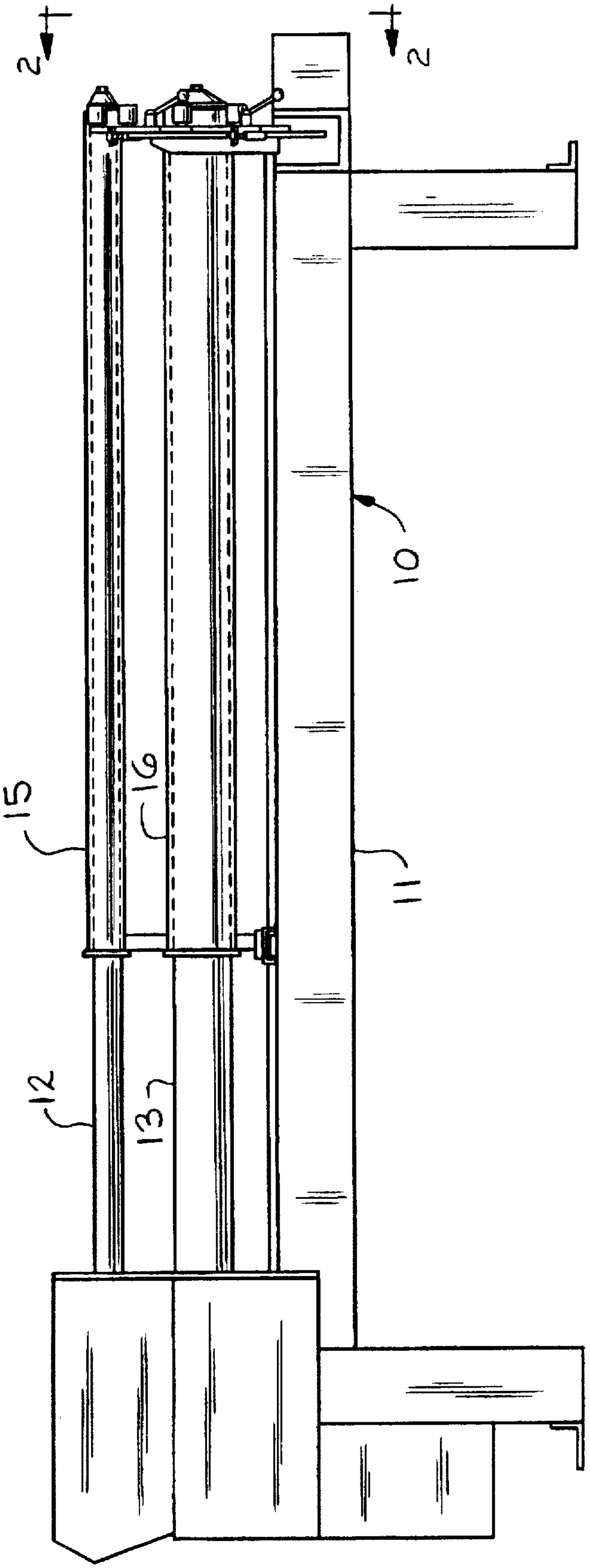
FIG. 1 is a elevational view showing a typical core cutting machine.
Figure 2:
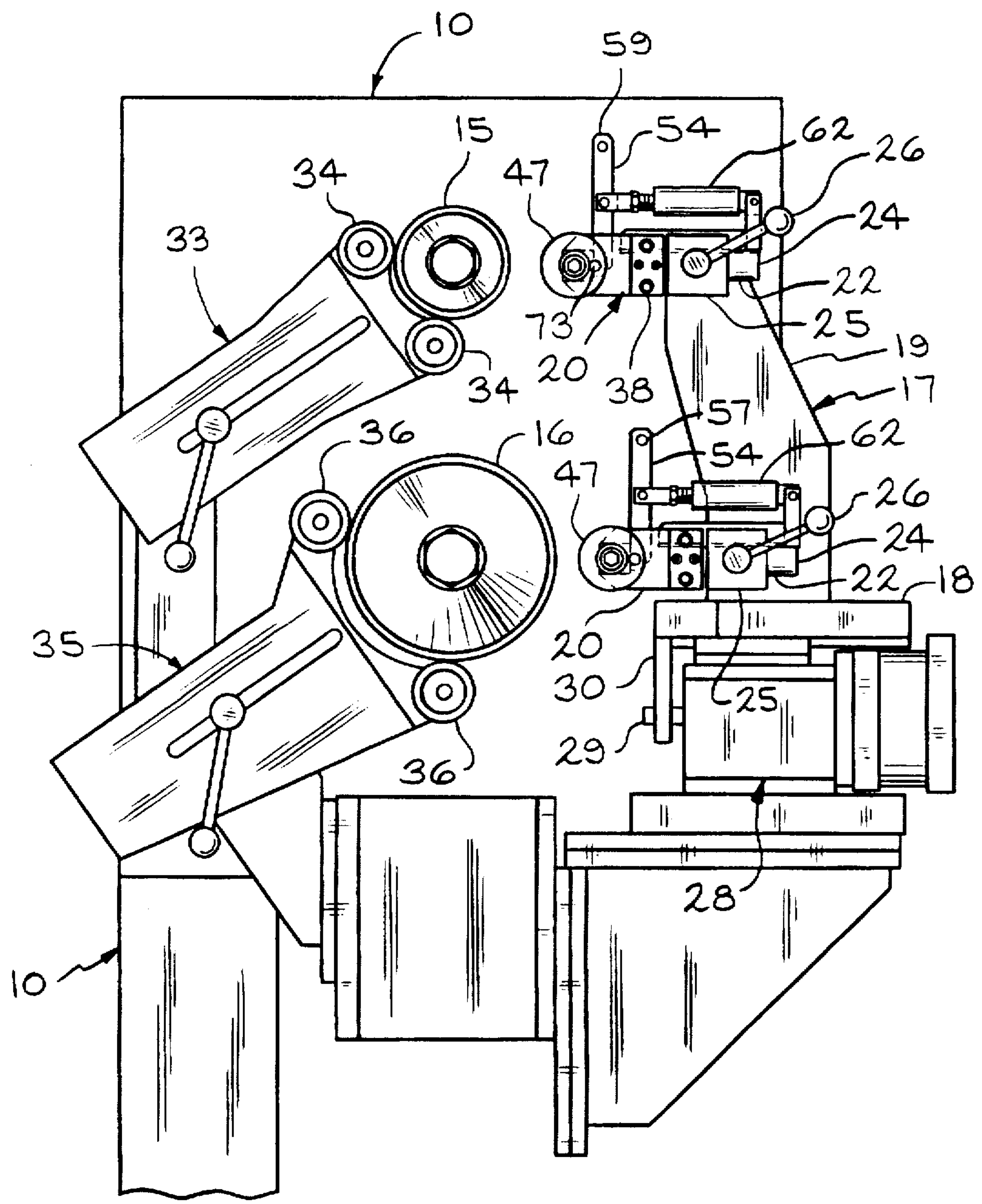
FIG. 2 is an end view taken along the line 2—2 of FIG. 1, shown on an enlarged scale, and showing two knife assemblies, according to the present invention.

A typical core cutting machine is generally indicated in FIGS. 1 and 2 by the reference number 10. The core cutting machine 10 includes a base 11, an upper mandrel 12 and a lower mandrel 13. Core tubes, such as cardboard cylinders 15 and 16, are mounted on the mandrels 12 and 13, respectively, during the cutting operation. Details of the core cutting machine 10 are given in U.S. Pat. No. 5,555,783, which is incorporated herein by reference. The core cutting machine 10 rotates the tubes 15 and 16 during the cutting operation. Referring to FIG. 2, the core cutting machine 10 includes a cutter assembly 17 having a moveable platform 18, an upwardly extending arm 19 and a pair of knife assemblies 20, according to the present invention. The knife assemblies 20 are connected by a support 22 having a circular front end 23 and a rectangular rear end 24. The cutter assembly 17 of the core cutting machine 10 includes holders 25 mounted on the arm 19. The holders 25 receive the rear ends 24 of the supports 22. The holders 25 include handle assemblies 26 which releasably secure the supports 22 to the holders 25.

A cylinder 28 having a rod 29 is connected to the moveable platform 18 by a support member 30. Actuation of the cylinder 28 and its rod 29 provide the primary adjustment of the knife assemblies 20 toward and away from the core tubes 15 and 16.

The core cutting machine 10 includes an upper support roller assembly 33 having rollers 34 which are positioned adjacent the core tube 15. Similarly, the core cutting machine 10 includes a lower support roller assembly 35 which includes rollers 36 positioned adjacent the core tube 16.

When the knife assemblies 20 are located in a cutting position adjacent the tubes 15 and 16, the support roller assemblies 33 and 35 provide the counter active forces to resist deflection of the mandrels 12 and 13 during the cutting operation.

Figure 3:
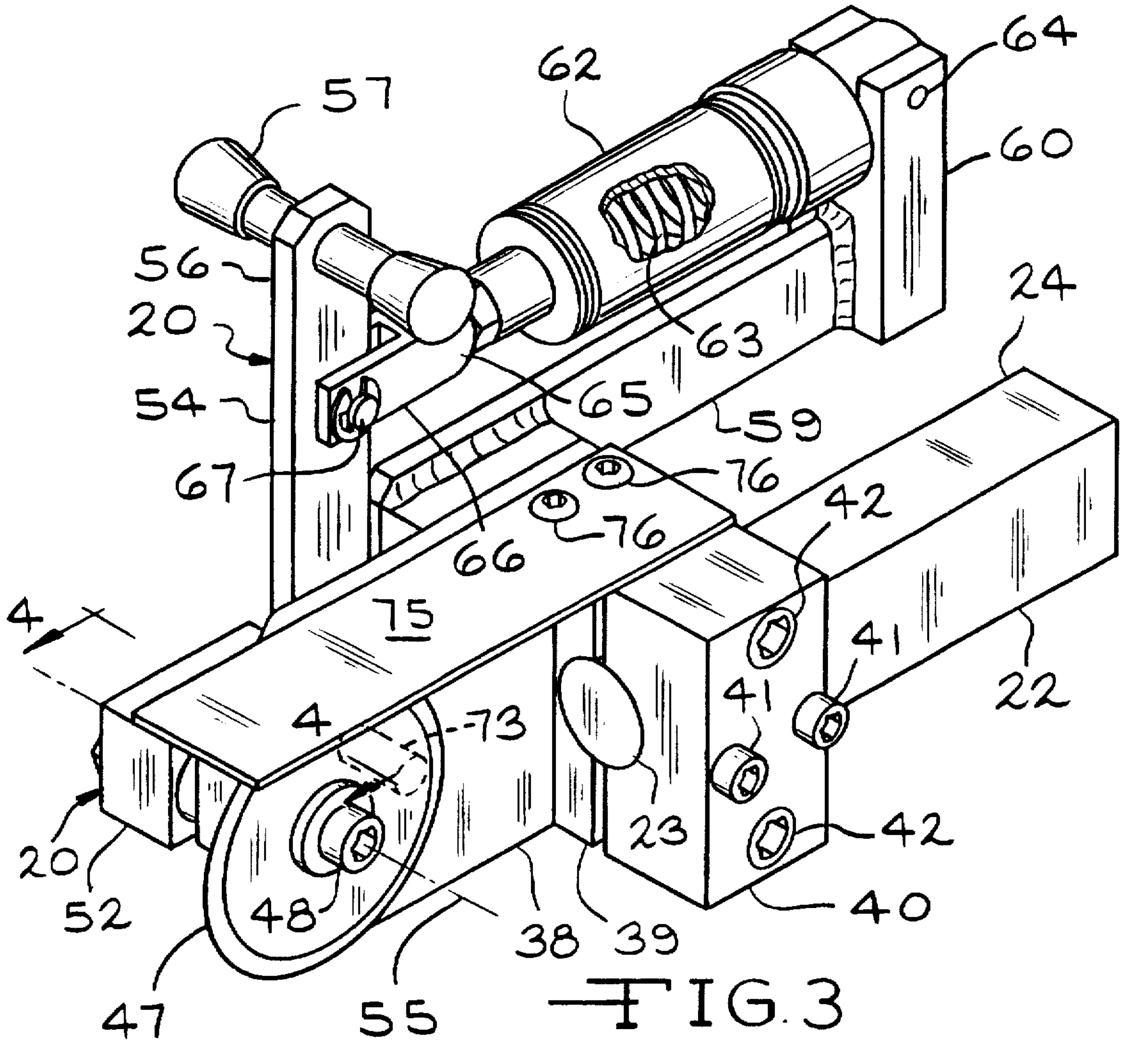
FIG. 3 is a perspective view of the knife assembly, according to the present invention, shown on an enlarged scale.
Figure 4:
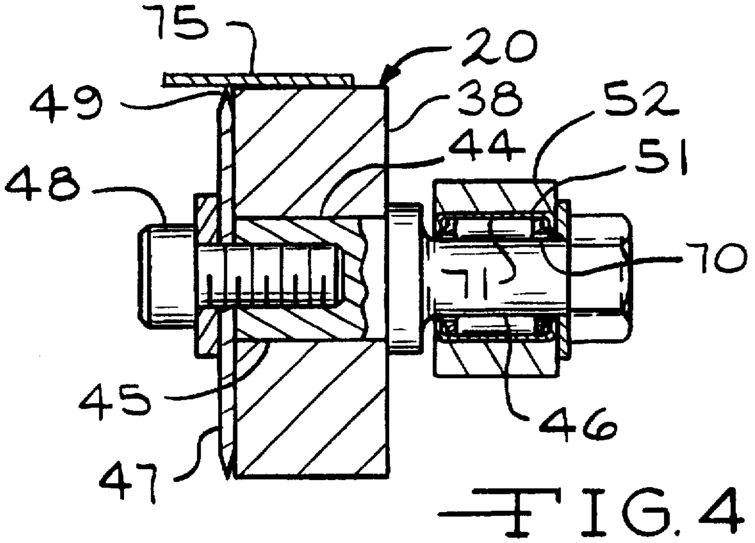
FIG. 4 is a fragmentary cross-sectional view taken along the line 4—4 of FIG. 3 and shown on an enlarged scale.

Referring to FIGS. 3 and 4, the knife assembly 20, according to the present invention, includes a mounting member 38 having a cross leg 39 and an end cap 40. The end cap 40 and the cross leg 39 are secured to the front end 23 of the support 22 by screws 41. Screws 42 secure the end cap 40 to the cross leg 39. A shaft 44 having a first end 45 and second end 46 is mounted for rotation by said mounting member 38. A circular knife or blade 47 is fixably mounted to the first end 45 of the shaft 44 by a screw 48. In the present embodiment the knife or blade 47 has a circular outer edge 49 and a two inch diameter. However, the knife blade 47 does not necessarily have to have a circular periphery nor a specific diameter. Referring to FIG. 4, a one-way clutch 51 is mounted on the second end 46 of the shaft 44. In the present embodiment the one-way clutch 51 is a prior art one-way Torrington roller clutch. This type of prior art clutch allows movement of the outer housing in one direction and locks the housing to the shaft when rotated in an opposite direction.

Referring to FIGS. 3 and 4, the one-way clutch 51 is positioned within a clutch block 52. The one-way clutch 51 is operatively connected to an arm 54 which is welded to the clutch block 52 and which extends outwardly from the shaft 44. Referring to FIG. 3, the shaft has an axis of rotation 55. The arm 54 extends perpendicularly to the axis of rotation 55 of the shaft 44. In the present embodiment, the arm 54 has an outer end 56. A handle 57 is mounted adjacent the outer end 56 of the arm 54.

Referring to FIG. 3, a bracket 59 has a generally vertical rear end 60. The bracket 59 is welded to the cross leg 39 of the mounting member 38. A cylinder 62 including a return spring 63 has one end connected by a pin 64 to the vertical rear end 60 of the bracket 59. The cylinder 62 includes a rod 65 which mounts a clevis 66 at its front end. The clevis 66 is pivotally connected to the arm 54 by a pin 67.

Referring to FIG. 4, the one-way clutch 51 includes an inner portion 70 which is fixed to the second end 46 of the shaft 44 and an outer portion 71 which is operatively connected to the arm 54 through the clutch block 52.

In operation, when the knife or blade 47 becomes dull, the operator manually grasps the handle 57 and moves the outer end 56 of the arm 54 forwardly. The shaft 44 is rotated by the action of the locked up one-way clutch 51. Movement of the arm 54 in the forward or first direction rotates or indexes the shaft through a predetermined angle to rotate the blade a predetermined distance or increment. In the present embodiment, when using a two inch diameter circular knife, the predetermined angle is approximately 7.2° resulting in a blade advancement of ⅛ inch (0.32 cm.). The specific amount of advancement desired depends on the shape of the blade and also the diameter of the blade together with other variables which include the thickness of the tube being cut and the material which is being cut.

After the blade is rotated the desired amount, which is predetermined by the stroke of the cylinder 62, the operator manually releases the handle 57 and the return spring 63, which is operatively connected to the arm 54 moves the arm rearwardly in a second direction which is opposite to the first direction when the arm 57 is manually pushed forward. At this time, after the cylinder rod 65 is retracted, the handle 57 and cylinder 62 are in position for another cycle. During the rearward movement of the arm 54, the inner portion 70 and the outer portion 71 of the one-way clutch are disconnected from one another and the shaft 44 and blade 47 remain stationary.

In the present embodiment, referring to FIG. 3, a magnet 73 is mounted by the mounting member 38 adjacent the knife or blade 47. When the arm 54 is moved in the rearward or second direction, the magnetic forces of the magnet 73 urge the blade 47 to remain static. In another embodiment, not shown, a second one-way clutch is mounted on the end of the shaft which mounts the blade. This one-way clutch operates in the reverse manner of the one-way drive clutch 51. The second one-way clutch insures that the blade 47 does not rotate from its desired new cutting position during the rearward movement of the arm 54 and the handle 57.

Referring to FIG. 3, a horizontal shield 75 is mounted over the circular knife 47. The shield is connected to the cross leg 39 of the mounting member 38 by screws 76.

Figure 5:
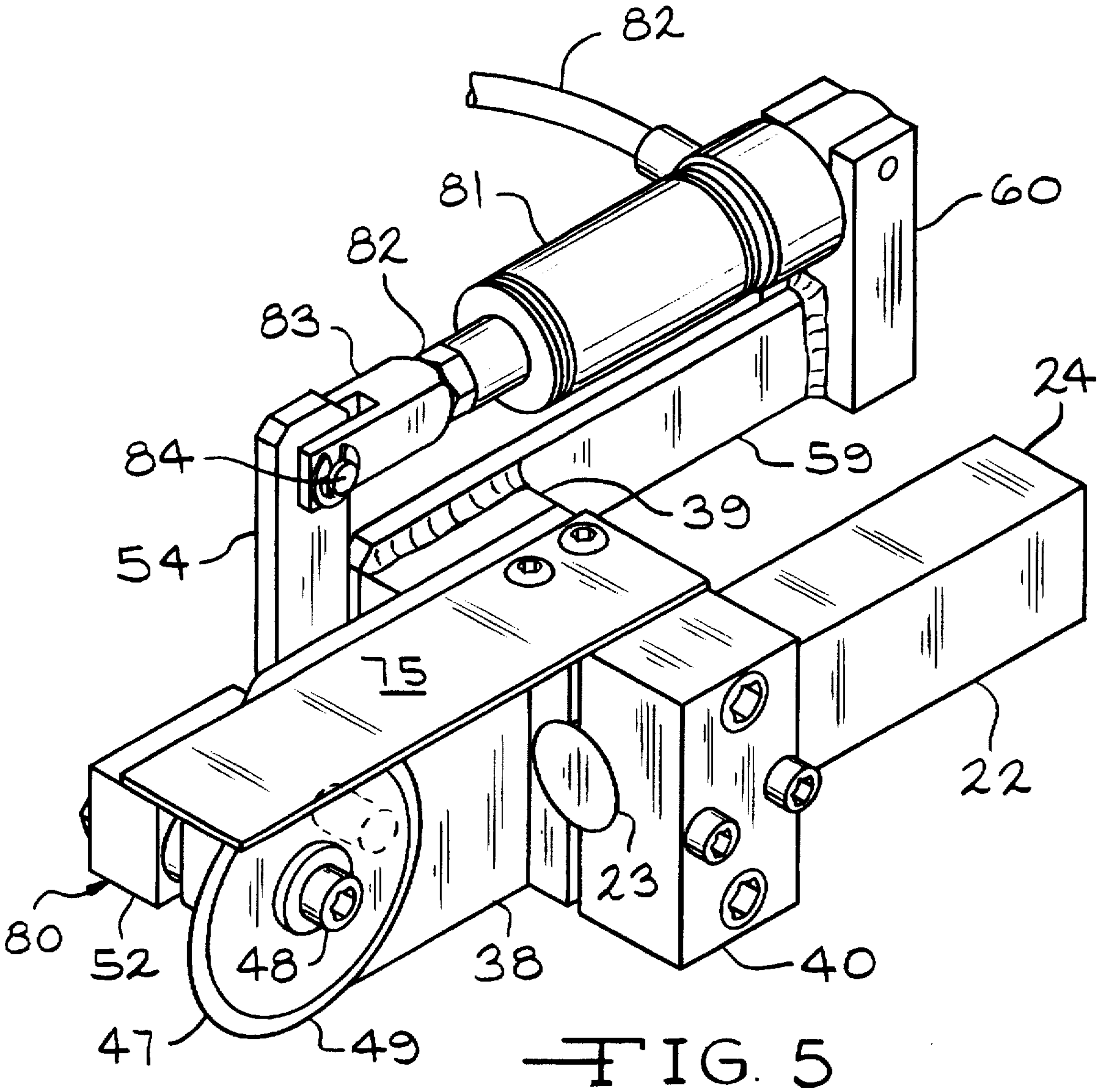
FIG. 5 is a perspective view of another embodiment of a knife assembly, according to the present invention.

Referring to FIG. 5, another embodiment of a knife assembly, according to the present invention is generally indicated by the reference number 80. Common components of the knife assembly 80 are given the same reference numerals as the above-described knife assembly 20. The main difference between the two embodiments is that the knife assembly 80 is an automatic indexing unit, rather than a manual indexing unit. A cylinder 81 which is a spring returned air cylinder is mounted by the vertical rear end 60 of the bracket 59. An air hose 82 is connected to the cylinder 81. The cylinder 81 includes a rod 82 which mounts a clevis 83 at its outer end. The clevis 83 is pivotally mounted to the arm 54 by a pin 84.

During operation of the knife assembly 80, according to the present invention, a programmable logic control actuates the cylinder 81 after a predetermined number of cuts. The rod 82 is extended and the arm 54 moved forward in the first direction. In a manner similar to the operation of the knife assembly 20, this movement acting through the one-way roller clutch 51 rotates the shaft 44 and the knife or blade 47 which is fixably mounted on the first end of the shaft 44. This rotation moves or indexes the knife 47 through a predetermined angle resulting in a predetermined incremental movement of the knife 47. The air activated spring cylinder 81 then urges the lever arm 54 in a rearward or second direction. At this time, the knife assembly 80 is moved back to its home position, as indicated in FIG. 5 awaiting the beginning of another cycle.

Many revisions may be made to the above-described embodiments without departing from the scope of the present invention or from the following claims.

I claim:

1. A knife assembly comprising, a mounting member, a shaft having first and second ends mounted for rotation by said mounting member, a circular knife fixably mounted adjacent said first end of said shaft, a one-way clutch mounted adjacent said second end of said shaft, an arm operatively connected to said one-way clutch and extending outwardly from said shaft, whereby movement of said arm in a first direction rotates said shaft and said knife a predetermined increment, a spring operatively connected to said arm for moving said arm in a second direction opposite to said first direction and a magnet mounted adjacent said knife, wherein when said arm is moved in such second direction, the magnetic forces of said magnet urge said knife to remain static.

2. A knife assembly, according to claim 1, wherein a cylinder is operatively connected to said mounting member, said spring being positioned within said cylinder, said cylinder being operatively connected to said arm.

3. A knife assembly, according to claim 1, wherein said arm has an outer end and a handle mounted adjacent said outer end of said arm.

4. A knife assembly, according to claim 1, wherein said one-way clutch includes an inner portion mounted on said shaft and an outer portion surrounding said inner portion, said arm being operatively connected to said outer portion.

5. A knife assembly, according to claim 1, including an air cylinder operatively connected between said arm and said mounting member, whereby actuation of said air cylinder moves said arm in such first direction.

6. A knife assembly, according to claim 5, including a return spring mounted within said cylinder to move said arm in a second direction opposite to said first direction.

7. A knife assembly comprising a mounting member, a shaft having first and second ends mounted for rotation by said mounting member, a circular knife fixably mounted on said first end of said shaft, a one-way roller clutch mounted on said second end of said shaft, a lever arm having an inner end operatively connected to said one-way roller clutch and an outer end, said lever arm extending perpendicular to said shaft, a said one-way roller clutch including an inner portion mounted on second end of said shaft and an outer portion surrounding said inner portion, said lever arm being operatively connected to said outer portion of said one-way roller clutch, and a fluid cylinder operatively connected to said lever arm, wherein movement of said lever arm in a first direction rotates said shaft a predetermined increment, said fluid cylinder including return means for urging said lever arm in a second direction opposite to said first direction.

8. A knife assembly, according to claim 7, including a horizontal shield mounted over said circular knife.

9. A knife assembly, according to claim 7, wherein said cylinder includes a return spring urging said lever arm in a second direction opposite to said first direction.

10. A knife assembly, according to claim 9, wherein said fluid cylinder is an air cylinder and actuation of said air cylinder moves said lever arm in said first direction.

11. A knife assembly comprising, a mounting member, a shaft having first and second ends mounted for rotation by said mounting member, a circular knife fixably mounted adjacent said first end of said shaft, a one-way clutch mounted adjacent said second end of said shaft, an arm operatively connected to said one-way clutch and extending outwardly from said shaft, whereby movement of said arm in a first direction rotates said shaft and said knife a predetermined increment, an air cylinder operatively connected between said arm and said mounting member, whereby actuation of said cylinder moves said arm in such first direction and a return spring mounted within said cylinder to move said arm in a second direction opposite to said first direction.

12. A knife assembly comprising a mounting member, a shaft having first and second ends mounted for rotation by said mounting member, a circular knife fixably mounted on said first end of said shaft, a one-way roller clutch mounted on said second end of said shaft, a lever arm having an inner end operatively connected to said one-way roller clutch and an outer end, said lever arm extending perpendicular to said shaft, and a cylinder operatively connected to said lever arm, wherein movement of said lever arm in a first direction rotates said shaft a predetermined increment, said cylinder including a return spring urging said lever arm in a second direction opposite to said first direction, wherein said cylinder is an air cylinder and actuation of said air cylinder moves said lever arm in said first direction.

13. A knife assembly, according to claim 12, wherein said one-way roller clutch includes an inner portion mounted on second end of said shaft and an outer portion surrounding said inner portion, said lever arm being operatively connected to said outer portion of said one-way roller clutch.

* * * * *